United States Patent
Shim (10) Patent No.: US 10,090,685 B2
(45) Date of Patent: Oct. 2, 2018

(54) ELECTRICITY PROVIDING SYSTEM INCLUDING BATTERY ENERGY STORAGE SYSTEM

(71) Applicant: LSIS CO., LTD., Anyang-si, Gyeonggi-do (KR)

(72) Inventor: Jae Seong Shim, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 325 days.

(21) Appl. No.: 14/960,146

(22) Filed: Dec. 4, 2015

(65) Prior Publication Data

US 2016/0268818 A1    Sep. 15, 2016

(30) Foreign Application Priority Data

Mar. 10, 2015 (KR) .................. 10-2015-0033380

(51) Int. Cl.
*H02J 7/00* (2006.01)
*H02J 3/32* (2006.01)
*H02J 3/38* (2006.01)

(52) U.S. Cl.
CPC ............. *H02J 7/0021* (2013.01); *H02J 3/32* (2013.01); *H02J 3/383* (2013.01); *H02J 3/386* (2013.01); *Y02E 10/563* (2013.01); *Y02E 10/566* (2013.01); *Y02E 10/763* (2013.01); *Y02E 40/10* (2013.01); *Y02E 70/30* (2013.01)

(58) Field of Classification Search
CPC .. H02J 7/0021; H02J 3/32; H02J 7/007; H02J 7/022; H02J 7/044
USPC ........................................................ 320/134
See application file for complete search history.

(56) References Cited

U.S. PATENT DOCUMENTS

| | | | | |
|---|---|---|---|---|
| 4,341,345 A | * | 7/1982 | Hammer | F25D 29/00 165/257 |
| 5,111,131 A | * | 5/1992 | Somerville | H02J 7/022 320/160 |
| 5,250,891 A | * | 10/1993 | Glasgow | H02J 7/022 320/140 |
| 5,304,917 A | * | 4/1994 | Somerville | H02J 7/0081 320/148 |
| 5,459,390 A | * | 10/1995 | Tomazic | G01R 31/3631 320/134 |

(Continued)

FOREIGN PATENT DOCUMENTS

CN    204131153 U    1/2015
CN    104679094 A  * 6/2015

(Continued)

OTHER PUBLICATIONS

Korean Intellectual Property Office Application No. 10-2015-0033380, Office Action dated Feb. 28, 2017, 5 pages.

(Continued)

*Primary Examiner* — Robert Grant
*Assistant Examiner* — John Trischler
(74) *Attorney, Agent, or Firm* — K&L Gates LLP (57) ABSTRACT

Disclosed is a power supply system. A power supply system according to an embodiment includes a system control unit configured to set a first system droop curve for a plurality of batteries and a charging control unit configured to control charging/discharging of the plurality of batteries on the basis of the first system droop curve.

6 Claims, 7 Drawing Sheets

(56) References Cited

U.S. PATENT DOCUMENTS

| | | | |
|---|---|---|---|
| 5,635,773 A * | 6/1997 | Stuart | H02J 9/062 307/66 |
| 5,798,633 A * | 8/1998 | Larsen | H02J 3/28 307/87 |
| 5,945,941 A * | 8/1999 | Rich, III | G01S 7/282 330/297 |
| 5,978,236 A * | 11/1999 | Faberman | H02J 9/061 307/66 |
| 6,057,607 A * | 5/2000 | Rader, III | H02M 3/1563 307/11 |
| 6,118,678 A * | 9/2000 | Limpaecher | H02M 5/4505 307/109 |
| 6,278,622 B1 | 8/2001 | Shimazaki | H02J 3/38 363/36 |
| 6,373,222 B2 * | 4/2002 | Odaohhara | G06F 1/263 320/116 |
| 6,420,850 B1 * | 7/2002 | Thurman | H02J 9/06 320/130 |
| 6,522,030 B1 * | 2/2003 | Wall | H02J 3/46 307/43 |
| 6,538,497 B2 * | 3/2003 | Thomas | H02J 1/10 307/44 |
| 6,603,286 B2 * | 8/2003 | Herrmann | H02J 7/0029 320/134 |
| 6,952,783 B2 * | 10/2005 | Koertzen | G06F 1/26 307/43 |
| 6,975,494 B2 * | 12/2005 | Tang | G06F 1/26 323/272 |
| 7,116,010 B2 * | 10/2006 | Lasseter | H02J 3/46 307/45 |
| 7,116,011 B2 * | 10/2006 | Nguyen | G06F 1/305 307/103 |
| 7,135,836 B2 * | 11/2006 | Kutkut | H02J 7/022 320/116 |
| 7,239,035 B2 * | 7/2007 | Garces | F03D 9/008 290/43 |
| 7,375,443 B2 * | 5/2008 | Nguyen | G06F 1/305 307/103 |
| 7,381,490 B2 * | 6/2008 | Higashionji | H01M 8/04559 320/128 |
| 7,415,621 B2 * | 8/2008 | Odaohhara | H02J 9/005 713/300 |
| 7,459,803 B2 * | 12/2008 | Mosman | H02J 9/06 307/64 |
| 7,474,079 B2 * | 1/2009 | Hashimoto | H02J 7/022 320/138 |
| 7,521,898 B2 * | 4/2009 | Kobayashi | H01M 8/04559 320/101 |
| 7,550,876 B2 * | 6/2009 | Cassel | H02M 3/07 307/108 |
| 7,554,221 B2 * | 6/2009 | Cassel | H02M 3/07 307/108 |
| 7,560,829 B2 * | 7/2009 | Proefrock | H02J 1/08 307/18 |
| 7,626,363 B2 * | 12/2009 | Lafleur | H01M 10/052 320/134 |
| 7,635,967 B2 * | 12/2009 | Loucks | H02J 9/08 290/40 C |
| 7,687,937 B2 * | 3/2010 | Lasseter | H02J 3/38 307/65 |
| 7,689,841 B2 * | 3/2010 | Lee | G06F 1/266 307/44 |
| 7,750,605 B2 * | 7/2010 | Ragsdale | H03K 3/53 320/166 |
| 7,787,261 B2 * | 8/2010 | Farrington | H02M 3/33592 363/132 |
| 7,787,272 B2 * | 8/2010 | Lasseter | H02J 3/30 363/79 |
| 7,825,541 B2 * | 11/2010 | Herbener | H02J 9/066 307/64 |
| 7,839,122 B2 * | 11/2010 | Yoshida | H02J 7/0052 320/106 |
| 7,855,904 B2 * | 12/2010 | Kirbie | H03K 3/57 320/166 |
| 7,880,441 B2 * | 2/2011 | Kobayashi | H02J 7/34 307/44 |
| 7,923,974 B2 * | 4/2011 | Martin | H02M 3/157 323/212 |
| 7,932,637 B2 * | 4/2011 | Lasseter | H02J 3/38 307/19 |
| 7,977,919 B1 * | 7/2011 | Jaoude | H04B 1/06 320/129 |
| 7,989,977 B2 * | 8/2011 | Crane | B63H 21/20 307/8 |
| 8,054,039 B2 * | 11/2011 | Bauerle | B60L 3/003 320/109 |
| 8,120,203 B2 * | 2/2012 | Heineman | H02J 1/08 307/32 |
| 8,120,205 B2 * | 2/2012 | Heineman | G06F 1/26 307/52 |
| 8,125,753 B2 * | 2/2012 | Lee | H02J 9/06 307/64 |
| 8,149,597 B2 * | 4/2012 | Farrington | H02M 3/33592 363/132 |
| 8,301,312 B2 * | 10/2012 | Saikkonen | H02J 3/48 307/69 |
| 8,344,712 B2 * | 1/2013 | Martin | H02M 3/157 323/222 |
| 8,466,581 B2 * | 6/2013 | Kuran | H02J 3/38 307/69 |
| 8,487,477 B2 * | 7/2013 | Heineman | H02J 1/102 307/53 |
| 8,497,599 B2 * | 7/2013 | Roscoe | H02J 3/38 307/69 |
| 8,536,837 B1 * | 9/2013 | Jaoude | H04B 1/06 320/129 |
| 8,553,437 B2 * | 10/2013 | Berggren | H02J 1/102 363/34 |
| 8,638,072 B2 * | 1/2014 | Vilhauer | H02J 7/0029 320/162 |
| 8,664,783 B2 * | 3/2014 | Gibson | F02N 11/0866 123/445 |
| 8,667,788 B2 * | 3/2014 | Kenway | B60L 11/16 60/415 |
| 8,681,521 B2 * | 3/2014 | Hannas | H02M 7/155 363/129 |
| 8,736,112 B2 * | 5/2014 | Linden | H02J 1/12 307/102 |
| 8,786,289 B2 * | 7/2014 | Sekiguchi | G01R 31/362 320/116 |
| 8,829,911 B2 * | 9/2014 | Rich | H01M 10/42 320/106 |
| 8,847,785 B2 * | 9/2014 | Heath | H01M 10/425 320/100 |
| 8,880,233 B2 * | 11/2014 | Kearns | H02J 3/00 700/295 |
| 8,897,943 B2 * | 11/2014 | Sheidler | A01D 41/12 701/110 |
| 8,933,588 B2 * | 1/2015 | Tian | F02D 29/06 307/87 |
| 9,018,795 B2 * | 4/2015 | Koyanagi | H02J 3/32 307/21 |
| 9,042,141 B2 * | 5/2015 | Yu | H02M 7/537 323/282 |
| 9,088,207 B2 * | 7/2015 | Cassel | H02M 3/155 |
| 9,118,196 B2 * | 8/2015 | Roscoe | H02J 3/00 |
| 9,213,382 B2 * | 12/2015 | Paillet | G06F 1/26 |
| 9,244,506 B2 * | 1/2016 | Nielsen | G06F 1/26 |
| 9,244,511 B2 * | 1/2016 | Brooksbank | G06F 1/266 |
| 9,252,666 B2 * | 2/2016 | Sakita | H02J 7/022 |
| 9,333,865 B2 * | 5/2016 | Kawasaki | B60L 11/1811 |
| 9,356,448 B2 * | 5/2016 | Sugimoto | H02J 4/00 |
| 9,385,611 B2 * | 7/2016 | DeHaven | H02M 3/285 |
| 9,391,458 B2 * | 7/2016 | Chida | H02P 9/04 |
| 9,401,640 B2 * | 7/2016 | Karlsson | H02M 3/156 |
| 9,406,094 B2 * | 8/2016 | Kearns | H02J 3/00 |
| 9,418,392 B2 * | 8/2016 | Kearns | H02J 3/00 |
| 9,428,075 B2 * | 8/2016 | Fukui | B60L 3/00 |

(56) References Cited

U.S. PATENT DOCUMENTS

| | | | | |
|---|---|---|---|---|
| 9,431,854 | B2* | 8/2016 | Chen | H02J 9/062 |
| 9,455,576 | B2* | 9/2016 | De Neve | H02J 3/14 |
| 9,472,954 | B2* | 10/2016 | Piyabongkarn | H02J 3/32 |
| 9,483,098 | B2* | 11/2016 | Bridges | G06F 1/305 |
| 9,484,850 | B2* | 11/2016 | Hyypio | H02P 9/14 |
| 9,513,650 | B2* | 12/2016 | Larsson | H02J 3/1828 |
| 9,515,520 | B1* | 12/2016 | Kim | H02J 7/008 |
| 9,611,868 | B2* | 4/2017 | Kenway | H02J 1/00 |
| 9,616,763 | B2* | 4/2017 | Al-Awami | B60L 11/1862 |
| 9,634,508 | B2* | 4/2017 | Kearns | H02J 7/007 |
| 9,634,510 | B2* | 4/2017 | Choi | H02J 7/007 |
| 9,671,842 | B2* | 6/2017 | Nguyen | G06F 1/26 |
| 9,677,544 | B2* | 6/2017 | Li | F03D 9/257 |
| 9,690,267 | B2* | 6/2017 | Haj-Maharsi | F03D 7/0284 |
| 9,709,035 | B2* | 7/2017 | Sagi | F03D 7/048 |
| 9,735,616 | B2* | 8/2017 | Colombi | H02J 9/061 |
| 9,762,066 | B2* | 9/2017 | Majumder | H02J 4/00 |
| 9,764,856 | B2* | 9/2017 | Stevens | B64F 1/34 |
| 9,774,206 | B2* | 9/2017 | Kim | H02J 7/007 |
| 9,780,560 | B2* | 10/2017 | Koizumi | H02J 1/00 |
| 9,800,052 | B2* | 10/2017 | Li | H02J 3/32 |
| 9,837,822 | B2* | 12/2017 | Kang | H02J 3/32 |
| 9,915,243 | B2* | 3/2018 | Sagi | F03D 7/048 |
| 2001/0052758 | A1* | 12/2001 | Odaohhara | G06F 1/263 320/103 |
| 2002/0140494 | A1* | 10/2002 | Thomas | H02J 1/10 327/530 |
| 2002/0171398 | A1* | 11/2002 | Odaohhara | H02J 9/005 320/128 |
| 2003/0006650 | A1* | 1/2003 | Tang | G06F 1/26 307/43 |
| 2003/0090248 | A1* | 5/2003 | Koertzen | G06F 1/26 323/272 |
| 2003/0117110 | A1* | 6/2003 | Herrmann | H02J 7/0029 320/134 |
| 2004/0051387 | A1* | 3/2004 | Lasseter | H02J 3/46 307/80 |
| 2004/0061380 | A1* | 4/2004 | Hann | H02J 1/06 307/43 |
| 2004/0062058 | A1* | 4/2004 | Hann | H02J 1/102 363/15 |
| 2004/0125517 | A1* | 7/2004 | Nguyen | G06F 1/305 361/18 |
| 2004/0125531 | A1* | 7/2004 | Nguyen | G06F 1/305 361/118 |
| 2004/0189251 | A1* | 9/2004 | Kutkut | H02J 7/022 320/128 |
| 2004/0201283 | A1* | 10/2004 | Pai | H02J 3/40 307/69 |
| 2005/0214606 | A1* | 9/2005 | Higashionji | H01M 8/04559 429/432 |
| 2006/0132086 | A1* | 6/2006 | Altenburg | H02J 9/061 320/106 |
| 2006/0145538 | A1* | 7/2006 | Proefrock | H02J 1/08 307/18 |
| 2006/0208574 | A1* | 9/2006 | Lasseter | H02J 3/38 307/69 |
| 2007/0076341 | A1* | 4/2007 | Lee | H02J 9/06 361/92 |
| 2007/0103943 | A1* | 5/2007 | Mangtani | H02M 3/33507 363/20 |
| 2007/0114796 | A1* | 5/2007 | Garces | F03D 9/008 290/43 |
| 2007/0138996 | A1* | 6/2007 | Kobayashi | H01M 8/04559 320/101 |
| 2007/0139090 | A1 | 6/2007 | Cassel | |
| 2007/0146092 | A1* | 6/2007 | Cassel | H02M 3/07 333/20 |
| 2007/0229028 | A1* | 10/2007 | Hashimoto | H02J 7/022 320/114 |
| 2008/0034256 | A1* | 2/2008 | Mosman | H02J 9/06 714/43 |
| 2008/0054724 | A1* | 3/2008 | Hosomi | H02J 1/08 307/69 |
| 2008/0106238 | A1* | 5/2008 | Ragsdale | C12M 35/02 320/166 |
| 2008/0129117 | A1* | 6/2008 | Kobayashi | H02J 7/34 307/32 |
| 2008/0136264 | A1* | 6/2008 | Yoshida | H02J 7/0052 307/80 |
| 2008/0143297 | A1* | 6/2008 | Lafleur | H01M 10/052 320/136 |
| 2008/0211304 | A1* | 9/2008 | Farrington | H02M 3/33592 307/31 |
| 2008/0212343 | A1* | 9/2008 | Lasseter | H02J 3/30 363/39 |
| 2008/0309166 | A1* | 12/2008 | Herbener | H02J 9/066 307/64 |
| 2009/0021082 | A1* | 1/2009 | Loucks | H02J 9/08 307/87 |
| 2009/0174262 | A1* | 7/2009 | Martin | H02M 3/157 307/82 |
| 2010/0013304 | A1* | 1/2010 | Heineman | G06F 1/26 307/31 |
| 2010/0013305 | A1* | 1/2010 | Heineman | H02J 1/102 307/31 |
| 2010/0013306 | A1* | 1/2010 | Heineman | H02J 1/08 307/32 |
| 2010/0138070 | A1* | 6/2010 | Beaudoin | F03D 7/0284 700/297 |
| 2010/0156355 | A1* | 6/2010 | Bauerle | B60L 3/003 320/145 |
| 2010/0207456 | A1* | 8/2010 | Lasseter | H02J 3/38 307/85 |
| 2010/0284117 | A1* | 11/2010 | Crane | B63H 21/20 361/93.1 |
| 2010/0287419 | A1* | 11/2010 | Saikkonen | H02J 3/48 714/47.1 |
| 2010/0327657 | A1* | 12/2010 | Kuran | H02J 3/38 307/43 |
| 2011/0068631 | A1* | 3/2011 | Roscoe | H02J 3/38 307/69 |
| 2011/0164442 | A1* | 7/2011 | Hannas | H02M 7/155 363/129 |
| 2011/0175443 | A1* | 7/2011 | Koyanagi | H02J 3/32 307/21 |
| 2011/0187191 | A1* | 8/2011 | Farrington | H02M 3/33592 307/31 |
| 2011/0221408 | A1* | 9/2011 | Martin | H02M 3/157 323/272 |
| 2011/0241423 | A1* | 10/2011 | Bridges | G06F 1/305 307/31 |
| 2011/0247323 | A1* | 10/2011 | Kenway | B60L 11/16 60/415 |
| 2011/0257801 | A1* | 10/2011 | Kumula | F01D 15/10 700/287 |
| 2012/0104847 | A1* | 5/2012 | Roscoe | H02J 3/00 307/23 |
| 2012/0139504 | A1* | 6/2012 | Buiatti | G05F 1/67 320/166 |
| 2012/0200262 | A1* | 8/2012 | Gibson | F02N 11/0866 320/128 |
| 2012/0249084 | A1* | 10/2012 | Vilhauer | H02J 7/0029 320/162 |
| 2012/0280830 | A1* | 11/2012 | Heath | H01M 6/50 340/870.02 |
| 2012/0313593 | A1* | 12/2012 | Knuppel | F03D 7/0284 323/234 |
| 2013/0058133 | A1* | 3/2013 | Farrington | H02M 3/33592 363/17 |
| 2013/0127426 | A1* | 5/2013 | Berggren | H02J 1/102 323/234 |
| 2013/0187466 | A1* | 7/2013 | Sakai | G01R 19/16542 307/52 |
| 2013/0234523 | A1* | 9/2013 | Anichkov | H02J 3/1835 307/82 |
| 2013/0257150 | A1* | 10/2013 | Kawasaki | B60L 11/1811 307/10.1 |

(56) References Cited

U.S. PATENT DOCUMENTS

| | | | | |
|---|---|---|---|---|
| 2013/0257151 A1* | 10/2013 | Brooksbank | G06F 1/266 | 307/17 |
| 2013/0278056 A1* | 10/2013 | Koizumi | H02J 7/0068 | 307/18 |
| 2013/0285460 A1* | 10/2013 | DeHaven | H02M 3/285 | 307/82 |
| 2013/0320953 A1* | 12/2013 | Cassel | H02M 3/155 | 323/311 |
| 2013/0334887 A1* | 12/2013 | Linden | H02J 1/12 | 307/82 |
| 2014/0001873 A1* | 1/2014 | Tian | F02D 29/06 | 307/87 |
| 2014/0002007 A1* | 1/2014 | Patino | H02J 7/0086 | 320/107 |
| 2014/0067151 A1* | 3/2014 | Erhart | G05F 1/66 | 700/297 |
| 2014/0070617 A1* | 3/2014 | Detmers | H02J 7/041 | 307/64 |
| 2014/0070756 A1* | 3/2014 | Kearns | H02J 7/007 | 320/101 |
| 2014/0070876 A1* | 3/2014 | Paillet | G06F 1/26 | 327/538 |
| 2014/0088778 A1* | 3/2014 | Nguyen | G06F 1/26 | 700/295 |
| 2014/0088781 A1* | 3/2014 | Kearns | H02J 3/14 | 700/295 |
| 2014/0097683 A1* | 4/2014 | Piyabongkarn | H02J 3/32 | 307/26 |
| 2014/0111167 A1* | 4/2014 | Hyypio | H02P 9/14 | 322/20 |
| 2014/0114495 A1* | 4/2014 | Larsson | H02J 3/1828 | 700/297 |
| 2014/0152110 A1* | 6/2014 | Sugimoto | H02J 4/00 | 307/66 |
| 2014/0152112 A1* | 6/2014 | Chida | H02P 9/04 | 307/84 |
| 2014/0159493 A1* | 6/2014 | Chen | H02J 9/062 | 307/65 |
| 2014/0167504 A1* | 6/2014 | Harris | H02J 9/061 | 307/23 |
| 2014/0188300 A1* | 7/2014 | Nguyen | H02J 3/381 | 700/297 |
| 2014/0190155 A1* | 7/2014 | Kenway | B60L 11/16 | 60/415 |
| 2014/0192576 A1* | 7/2014 | Hannas | H02M 7/155 | 363/129 |
| 2014/0210402 A1* | 7/2014 | Sakita | H02M 3/1584 | 320/107 |
| 2014/0218985 A1* | 8/2014 | Yu | H02M 7/537 | 363/97 |
| 2014/0266061 A1* | 9/2014 | Wachal | H02J 7/0068 | 320/134 |
| 2014/0277879 A1 | 9/2014 | Sheidler et al. | | |
| 2014/0306662 A1* | 10/2014 | Kim | H02J 7/0016 | 320/118 |
| 2014/0316592 A1* | 10/2014 | Haj-Maharsi | F03D 7/0284 | 700/287 |
| 2015/0035497 A1* | 2/2015 | Hannas | H02M 7/155 | 320/163 |
| 2015/0091915 A1* | 4/2015 | Hurd | G06F 9/38 | 345/506 |
| 2015/0188325 A1* | 7/2015 | Wagner | H02J 7/0085 | 307/31 |
| 2015/0214754 A1* | 7/2015 | Choi | H02J 7/007 | 320/134 |
| 2015/0214757 A1* | 7/2015 | Zane | H02J 7/0021 | 320/107 |
| 2015/0222183 A1* | 8/2015 | Karlsson | H02M 3/156 | 323/271 |
| 2015/0240784 A1* | 8/2015 | Sagi | F03D 7/048 | 700/287 |
| 2015/0249363 A1* | 9/2015 | Humphrey, Jr. | H02J 1/102 | 307/44 |
| 2015/0258908 A1* | 9/2015 | Fukui | B60L 3/00 | 320/162 |
| 2015/0263568 A1* | 9/2015 | Colombi | H02J 9/061 | 307/65 |
| 2015/0322921 A1* | 11/2015 | Li | F03D 7/048 | 290/44 |
| 2015/0340897 A1* | 11/2015 | Uan-Zo-Li | H02J 7/0054 | 320/103 |
| 2015/0344152 A1* | 12/2015 | Stevens | B64F 1/34 | 307/9.1 |
| 2015/0372526 A1* | 12/2015 | Greening | G06F 1/263 | 320/134 |
| 2015/0378412 A1* | 12/2015 | Suryanarayanan | G06F 1/3206 | 713/340 |
| 2016/0013641 A1* | 1/2016 | Sun | H02J 3/18 | 307/24 |
| 2016/0013652 A1* | 1/2016 | Li | H02J 3/32 | 307/24 |
| 2016/0025111 A1* | 1/2016 | Kenway | H02J 1/00 | 60/327 |
| 2016/0061188 A1* | 3/2016 | Sagi | F03D 7/0284 | 290/44 |
| 2016/0079755 A1* | 3/2016 | Triebel | H02J 3/32 | 307/52 |
| 2016/0087475 A1* | 3/2016 | Kang | H02J 3/18 | 320/128 |
| 2016/0099563 A1* | 4/2016 | Brooksbank | G06F 1/266 | 307/17 |
| 2016/0118814 A1* | 4/2016 | Delpapa | H02J 7/007 | 320/107 |
| 2016/0134117 A1* | 5/2016 | Wolfrum | H02J 3/32 | 307/52 |
| 2016/0134122 A1* | 5/2016 | De Neve | H02J 3/14 | 307/31 |
| 2016/0149419 A1* | 5/2016 | Gersch | H02J 7/0013 | 320/107 |
| 2016/0190822 A1* | 6/2016 | Lee | H02J 3/32 | 307/24 |
| 2016/0204611 A1* | 7/2016 | Chambon | H02J 3/1835 | 307/26 |
| 2016/0226306 A1* | 8/2016 | Dong | H02J 1/00 | |
| 2016/0254671 A1* | 9/2016 | Cutright | G05B 19/048 | 700/295 |
| 2016/0257216 A1* | 9/2016 | Al-Awami | B60L 11/1862 | |
| 2016/0268802 A1* | 9/2016 | Shim | H02J 3/24 | |
| 2016/0274607 A1* | 9/2016 | Kudo | H02J 3/32 | |
| 2016/0276830 A1* | 9/2016 | Nasirian | H02J 3/18 | |
| 2016/0336765 A1* | 11/2016 | Trimboli | H02J 7/0021 | |
| 2016/0336767 A1* | 11/2016 | Zane | H02J 7/0021 | |
| 2016/0363952 A1* | 12/2016 | Garrone | G05F 5/00 | |
| 2016/0380455 A1* | 12/2016 | Greening | H02J 7/0044 | 320/114 |
| 2017/0005475 A1* | 1/2017 | Piyabongkarn | H02J 3/32 | |
| 2017/0093205 A1* | 3/2017 | Banno | H02M 3/00 | |
| 2017/0163049 A1* | 6/2017 | Zimmanck | H02J 7/0019 | |
| 2017/0227978 A1* | 8/2017 | Kudo | G05F 1/66 | |
| 2017/0264122 A1* | 9/2017 | Greening | H02J 7/0052 | |
| 2017/0317507 A1* | 11/2017 | Kudo | H02J 7/0014 | |

FOREIGN PATENT DOCUMENTS

| | | | | |
|---|---|---|---|---|
| CN | 104868502 A | * | 8/2015 | |
| JP | 05-190210 | | 7/1993 | |
| JP | 2011-113759 | | 6/2011 | |
| JP | 2013-191438 | | 9/2013 | |
| JP | 2014195401 | | 10/2014 | |
| KR | 10-2014-0098431 | | 8/2014 | |
| KR | 101426826 | | 8/2014 | |
| KR | 10-2015-0025429 | | 3/2015 | |
| WO | 2014-021363 | | 2/2014 | |
| WO | 2014123188 | | 8/2014 | |
| WO | 2014170373 | | 10/2014 | |
| WO | WO 2016105104 A1 | * | 6/2016 | G06Q 50/06 |

(56) References Cited

FOREIGN PATENT DOCUMENTS

WO     WO 2017096344 A1 *   6/2017
WO     WO 2017103697 A1 *   6/2017   ............. H04B 3/548

OTHER PUBLICATIONS

Japan Patent Office Application No. 2015-251211, Office Action dated Jan. 24, 2017, 2 pages.

Kim et al., "Adaptive Droop Control Method for Multiple Energy Storage Systems in DC Distribution System", Department of Electrical and Computer Engineering, Seoul National University, 3 pages.

Zou, et al.; "Wind Power Smoothing Method Using Hybrid Energy Storage System Based on SOC Hierarchical Optimization"; IEEE—Automation of Electric Power Systems; vol. 37, No. 24; Dec. 25, 2013; (6 pages).

Chinese Office Action for related Chinese Application No. 201610090033.9; action dated Dec. 29, 2017; (6 pages).

* cited by examiner

FIG.7

ELECTRICITY PROVIDING SYSTEM INCLUDING BATTERY ENERGY STORAGE SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0033380, filed on Mar. 10, 2015, the contents of which are all hereby incorporated by reference herein in its entirety.

BACKGROUND

The present disclosure relates to provision of an ancillary service for a power system, and particularly, to a method for operating a charging control unit for controlling charging/discharging of a battery.

A power supply system represents a storage device that stores power excessively generated in a power plant or new renewable energy irregularly generated and transmits power when power is temporarily insufficient.

In detail, the power supply system stores electricity in an electric power system in order to supply energy to a place when energy is required therein. In other words, the power supply system is one assembly including a storage in which a system is integrated with one product like a typical secondary battery.

The power supply system has become an essential device for storing unstable generated energy such as wind power energy which is a type of new renewable energy that has been recently and widely used and for stably supplying the stored energy back to a power system when necessary. If the power supply system is not provided, a serious problem such as sudden power failure may occur in the power system due to unstable power supply dependent on wind or solar light. Therefore, in such an environment, the field of storage is becoming more important and is extending to the field of a domestic power storage system.

Such a power supply system is installed in a generation system, a transmission/distribution system, and a consumer in a power system, and is used for the purpose of frequency regulation, stabilization of an output of a generator using new renewable energy, peak shaving, load leveling, emergency power supply, or the like.

The power supply system is classified into a physical energy storage type and a chemical energy storage type according to a storage type. Pumped-storage power generation, compressed air storage, a flywheel, or the like may be used for the physical energy storage type, and a lithium-ion battery, a lead storage battery, a NaS battery, or the like may be used for the chemical energy storage.

SUMMARY

Embodiments provide a power supply system for improving the efficiency of charging/discharging of batteries by setting one system droop curve for the batteries.

Embodiments also provide a power supply system for improving the efficiency of charging/discharging of batteries by setting a droop curve for each battery on the basis of an SOC level of each battery.

In one embodiment, a power supply system includes a battery energy storage system including: a system control unit configured to set a first system droop curve for a plurality of batteries; and a charging control unit configured to control charging/discharging of the plurality of batteries on the basis of the first system droop curve.

The charging control unit may obtain state of charge (SOC) level information from the plurality of batteries, and the system control unit may generate a second system droop curve on the basis of the SOC level information obtained from the charging control unit, and may equally set the second droop curve for the plurality of batteries.

The system control unit may set the first system droop curve on the basis of at least one of preset data or a system frequency.

The system control unit may set the second system droop curve on the basis of an average of the SOC level information obtained from the plurality of batteries.

The system control unit may set the second system droop curve on the basis of a piece of the SOC level information which has a largest difference with a reference value among pieces of the SOC level information obtained from the plurality of batteries, and the reference value may be at least one of a value set at an initial system designing time or a value based on the system frequency.

The charging control unit may obtain SOC level information from the plurality of batteries, and the system control unit may determine a reference frequency for generating a second system droop curve on the basis of the SOC level information obtained from the charging control unit.

The reference frequency may be determined for each battery.

The system control unit may transmit the determined reference frequency to the charging control unit, and the charging control unit may generate the second system droop curve on the basis of the received reference frequency, and may control the batteries on the basis of the second system droop curve.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments will be described in detail with reference to the accompanying drawings. In the following description, the terms "module" and "unit" for referring to elements are given or used interchangeably in consideration of ease of description, and thus, the terms per se do not necessarily represent different meanings or functions.

The advantages and features of the present invention, and methods for achieving the advantages and features will be apparent from the embodiments described in detail below with reference to the accompanying drawings. The present invention may, however, be embodied in different forms and should not be construed as being limited to the embodiments described below. Rather, these embodiments are provided so that this disclosure will be thorough and complete, and will fully convey the scope of the present invention to those skilled in the art, and the present invention is defined by the scope of claims. Like reference numerals refer to like elements throughout.

Detailed descriptions of well-known functions or configurations will not be provided in order not to unnecessarily obscure the present disclosure. The terms used herein are defined in consideration of the functions of the embodiments, but may be changed depending on the practice or intention of a user or operator. Thus, the definitions should be determined based on the overall content of the present disclosure.

Combinations of the operations of the flowcharts and the blocks in the accompanying drawings may be performed by computer program instructions. Since the computer program instructions may be installed in a processor of a general-purpose computer, a special-purpose computer, or any other programmable data processing equipment, the instructions performed by the processor of a computer or any other programmable data processing equipment generates a means for performing the functions described with respect to the blocks or flowcharts in the accompanying drawings. Since the computer program instructions may also be stored in a computer-usable or computer-readable memory oriented to a computer or any other programmable data processing equipment in order to implement functions in a specific manner, the instructions stored in the computer-usable or computer-readable memory may produce manufacture items involving instruction means for performing the functions described with respect to the blocks or flowcharts in the accompanying drawings. Since the computer program instructions may also be installed in a computer or any other programmable data processing equipment, the instructions which operates the computer or any other programmable data processing equipment by generating computer-executable processes by performing a series of operations in the computer or any other programmable data processing equipment may provide operations for performing the functions described with respect to the blocks or flowcharts in the accompanying drawings.

Furthermore, each block or each operation may represent a part of a code, a segment or a module including one or more executable instructions for performing specific logical function(s). Furthermore, it should be noted that the functions mentioned with respect to the blocks or operations may be performed in arbitrary order. For example, two contiguous blocks or operations illustrated in the drawings may be performed at substantially the same time, or may be performed in reverse order depending on corresponding functions.

Figure 1:
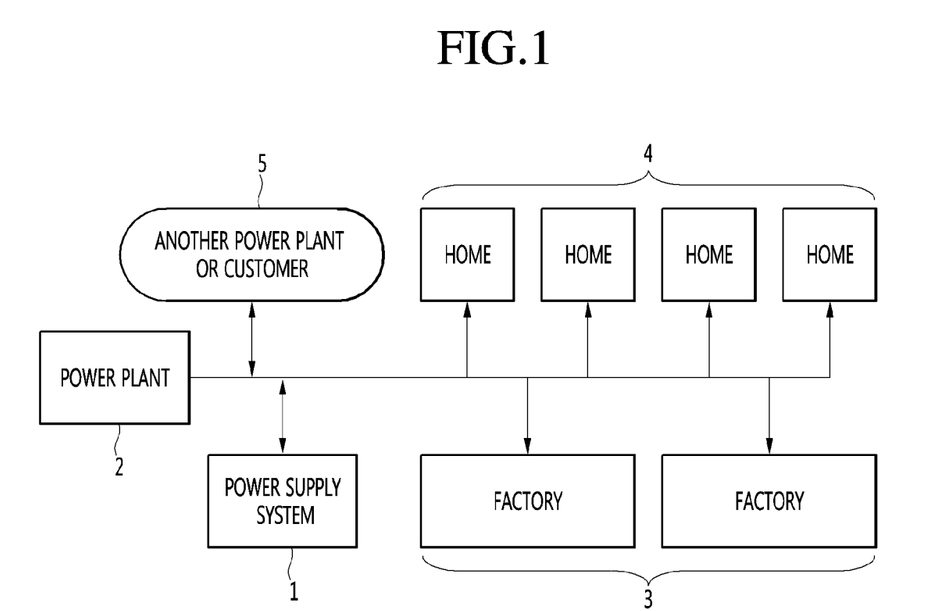
FIG. 1 is a block diagram illustrating an overall configuration of a power supply system.

FIG. 1 is a block diagram illustrating an overall configuration of a power supply system. As illustrated in FIG. 1, a power supply system 1 may constitute one platform together with a power plant 2, a factory 3, a home 4, and another power plant or customer 5.

According to an embodiment, energy generated in the power plant 2 may be stored in the power supply system 1.

Furthermore, the energy stored in the power supply system 100 may be transmitted to the factory 3 or the home 4, or may be sold to another power plant or customer.

Electric energy generated in the power plant 2 greatly varies with an environment or time. For example, in the case of photovoltaic power generation, the amount of power generation may vary with weather conditions or a sunrise time. In such a case, it may be difficult to stably use generated electric energy in the factory 3 or the home 4. To overcome this limitation, the electric energy generated in the power plant may be stored in the power supply system, and the stored electric energy may be stably output so that the energy may be used in the factory 3 or the home 4. Furthermore, remaining electric energy may be sold to the other customer 5. In addition, in the case where the factory 3 or the home 4 consumes more electric energy than the electric energy stored in the power supply system 100, electric energy may be purchased from the other power plant 5.

Figure 2:
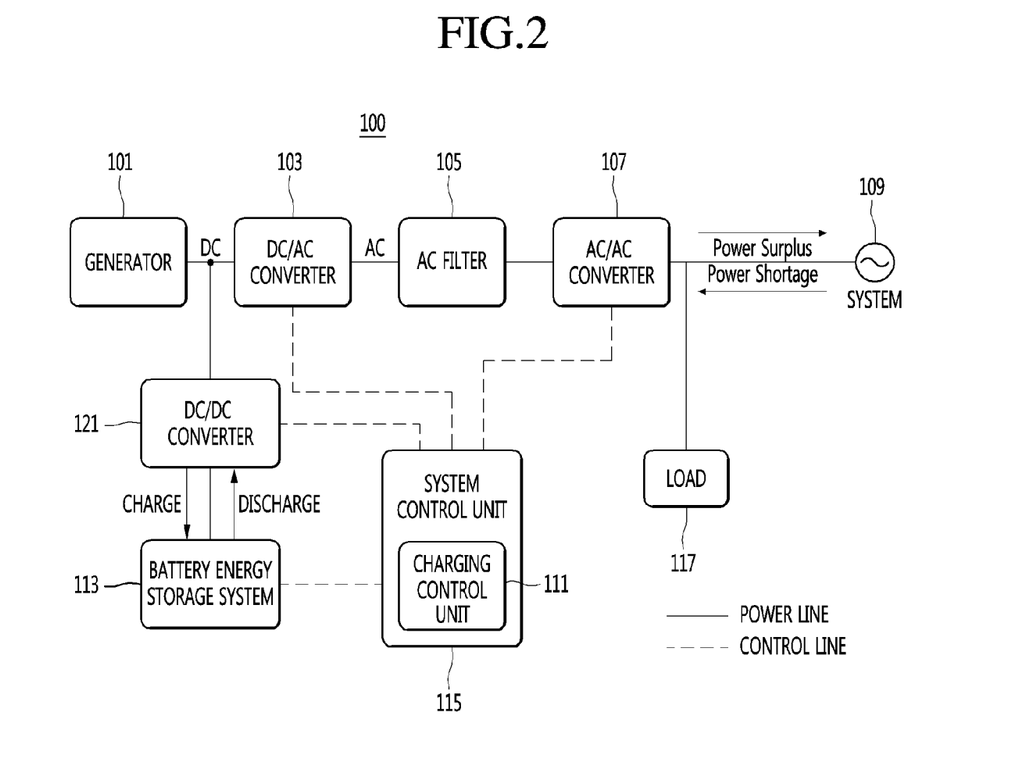
FIG. 2 is a block diagram illustrating a power supply system according to an embodiment.

FIG. 2 is a block diagram illustrating a generated power supply system according to an embodiment.

The power supply system 100 according to an embodiment includes a generator 101, a DC/AC converter 103, an AC filter 105, an AC/AC converter 107, a system 109, a charging control unit 111, a battery energy storage system 113, a system control unit 115, a load 117, and a DC/DC converter 121.

The generator 101 generates electric energy. In the case where the generator is a photovoltaic power generator, the generator 101 may be a solar cell array. A plurality of solar cell modules are combined with each other in the solar cell array. The solar cell module is a device in which a plurality of solar cells are connected to each other in series or in parallel to generate a predetermined voltage or current by converting solar energy into electric energy. Accordingly, the solar cell array absorbs solar energy and converts the solar energy into electric energy. In the case where a generation system is a wind power generation system, the generator 101 may be a fan for converting wind power energy into electric energy. However, as described above, the power supply system 100 may supply power only via the battery energy storage system 113 without the generator 101. In this case, the power supply system 100 may not include the generator 101.

The DC/AC converter 103 converts DC power into AC power. The DC/AC converter 103 receives, via the charging control unit 111, DC power supplied by the generator 101 or DC power discharged from the battery energy storage system 113 to convert the received power into AC power.

The AC filter 105 filters noise of the power converted into the AC power. Depending on a specific embodiment, the AC filter 105 may be omitted.

The AC/AC converter 107 converts a level of a voltage of the noise-filtered AC power so as to supply the power to the system 109 or the load 117. Depending on a specific embodiment, the AC/AC converter 107 may be omitted.

The system 109 represents a system in which a number of power plants, substations, transmission/distribution lines, and loads are integrated with each other so that the generation or use of power is performed therein.

The load 117 receives electric energy from the generation system and consumes power. The battery energy storage system 113 receives electric energy from the generator 101 so as to be charged, and discharges the charged electric energy according to power demand-supply conditions of the system 109 or the load 117. In detail, in the case where the system 109 or the load 117 is lightly loaded, the battery energy storage system 113 receives idle power from the generator 101 so as to be charged. In the case where the system 109 or the load 117 is overloaded, the battery energy storage system 113 discharges the charged power to supply power to the system 109 or the load 117. The power demand-supply conditions of the system 109 or the load 117 may greatly vary with a time slot. Therefore, it is inefficient for the power supply system 100 to uniformly supply the power supplied by the generator 101 without considering the power demand-supply conditions of the system 109 or the load 117. Therefore, the power supply system 100 controls the amount of power supply according to the power demand-supply conditions of the system 109 or the load 117, using the battery energy storage system 113. In this manner, the power supply system 100 may efficiently supply power to the system or the load 117.

The DC/DC converter 121 converts a level of DC power supplied or received by the battery energy storage system 113. Depending on a specific embodiment, the DC/DC converter 121 may be omitted.

The system control unit 115 controls operation of the DC/AC converter 103 and the AC/AC converter 107. The system control unit 115 may include the charging control unit 111 for controlling charging or discharging of the battery energy storage system 113. The charging control unit 111 controls charging or discharging of the battery energy storage system 113. In the case where the system 109 or the load 117 is overloaded, the charging control unit 111 receives power from the battery energy storage system 113 to supply the power to the system 109 or the load 117. In the case where the system 109 or the load 117 is lightly loaded, the charging control unit 111 receives power from an external power supply or the generator 101 to transfer the power to the battery energy storage system 113.

Figure 3:
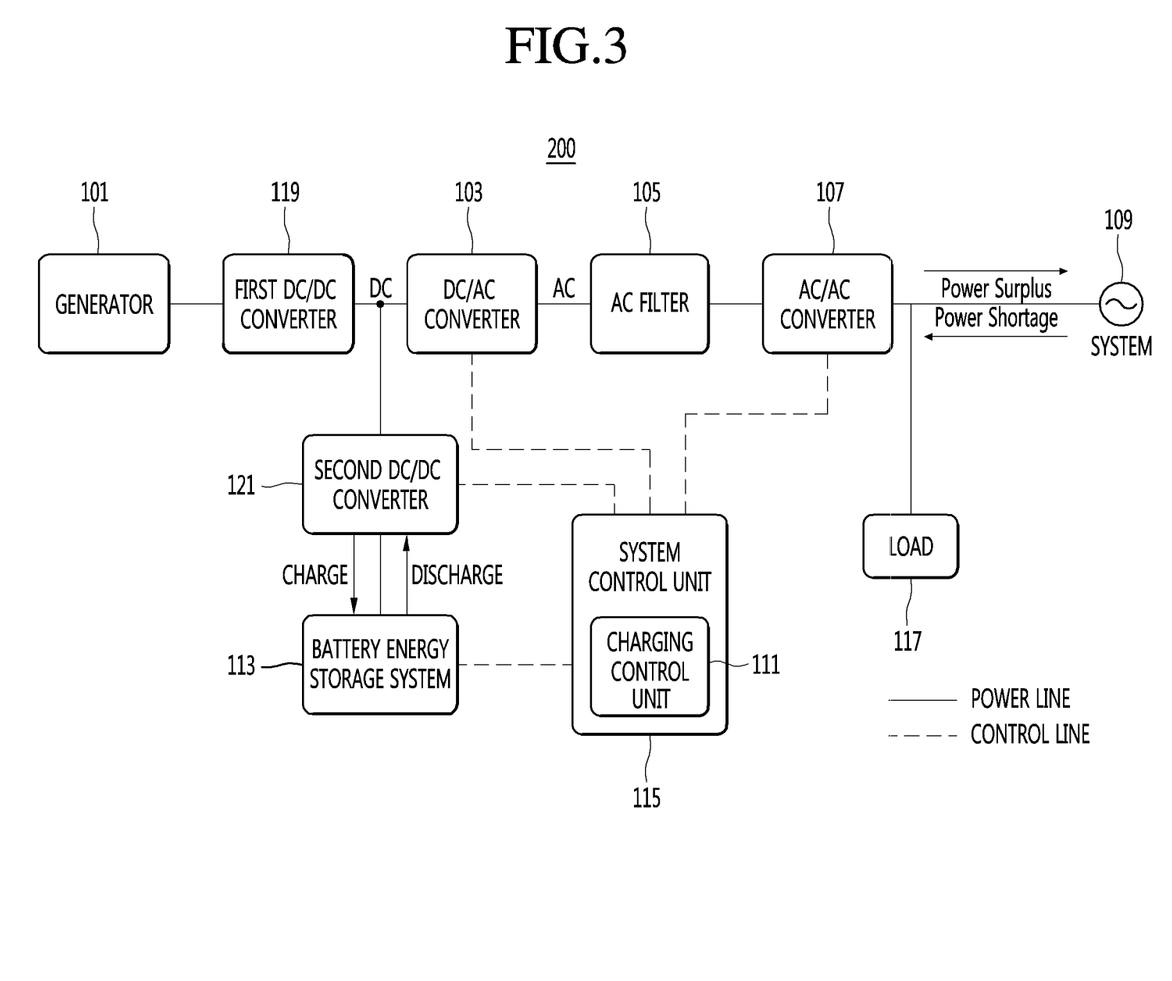
FIG. 3 is a block diagram illustrating a small-capacity power supply system according to an embodiment.

FIG. 3 is a block diagram illustrating a small-capacity power supply system according to an embodiment.

A small-capacity power supply system 200 according to an embodiment includes a generator 101, a DC/AC converter 103, an AC filter 105, an AC/AC converter 107, a system 109, a charging control unit 111, a battery energy storage system 113, a system control unit 115, a first DC/DC converter 119, a load 117, and a second DC/DC converter 121.

Compared to the system of FIG. 2, the system of FIG. 3 further includes the first DC/DC converter 119. The first DC/DC converter 119 converts a voltage of DC power generated by the generator 101. In the small-capacity power supply system 200, the voltage of power generated by the generator 101 is low. Therefore, voltage boosting is required in order to input the power supplied by the generator 101 to a DC/AC converter. The first DC/DC converter 119 converts the voltage of power generated by the generator 101 into a voltage able to be input to the DC/AC converter 103.

Figure 4:
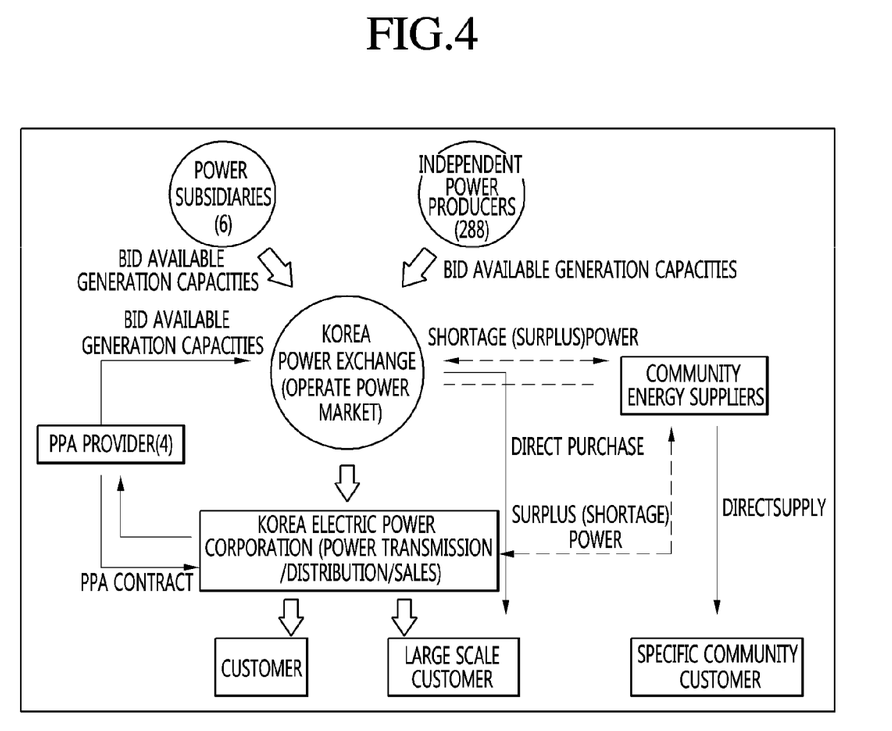
FIG. 4 is a conceptual diagram illustrating a structure of an electricity market according to an embodiment.

FIG. 4 is a conceptual diagram illustrating a structure of a power market according to an embodiment.

Referring to FIG. 4, the power market includes power subsidiaries, independent power producers, power purchase agreement (PPA) providers, community energy suppliers, Korea Power Exchange, Korea Electric Power Corporation, customer, large scale customers, and specific community customers. As of 2014, domestic power generation companies include six power subsidiaries separated from the Korea Electric Power Corporation and 288 independent power producers.

The power subsidiaries, the independent power producers, the PPA providers, and the community energy suppliers may represent power generation companies, may bid their available generation capacities depending on the amount of power able to be generated by their own generators in the Korea Power Exchange, and may obtain profits from the bid.

Each power subsidiary and each independent power producer bid their available generation capacities of each generator on a daily basis in the Korea Power Exchange, and the Korea Power Exchange operates the power market.

The Korea Electric Power Corporation purchases power at a price determined in the power market, and supplies the purchased power to customers. Accordingly, the Korea Electric Power Corporation takes charge of power transmission, distribution, and sales.

The PPA providers may be contractors of the PPA, and the PPA providers bid their available generation capacities to the power market. The payment for power transaction is settled not by the price determined in the power market but by a PPA contract with the Korea Electric Power Corporation. Furthermore, a resultant settlement rule may be added to settlement rule information of the power market.

The community energy suppliers generate power with certain scale generators, and directly sell the generated power in their licensed areas. Furthermore, the community energy suppliers may directly purchase insufficient power from the Korea Electric Power Corporation or the power market, or may sell surplus power to the Korea Electric Power Corporation or the power market.

The large scale customers of which contract power is at least 30,000 kW may directly purchase desired power from the power market without intervention of the Korea Electric Power Corporation.

One power supply system 100 may include the battery energy storage system 113. Furthermore, the battery energy storage system 113 may include a plurality of batteries (not shown) and the charging control unit 111 for controlling each battery. The plurality of batteries included in the power supply system 100 may have different levels of a state of charge (SOC). In other words, the plurality of batteries may have different amounts of currently remaining electric energy.

However, since the power supply system 100 is intended for stably supplying electric energy, it may be difficult to stably supply electric energy if the plurality of batteries have different SOC levels. In detail, electric energy should be equally output from the plurality of batteries so that electric energy output from the entire power supply system 100 may be maintained constantly. Furthermore, the plurality of batteries should be equally charged with electric energy so that the electric energy may be equally discharged thereafter. If electric energy is not equally charged or discharged to or from the batteries, a specific battery may be overloaded, which may shorten the life of the entire power supply system.

Therefore, a certain criterion is required in order to efficiently perform charging/discharging of a plurality of different batteries.

Figure 5:
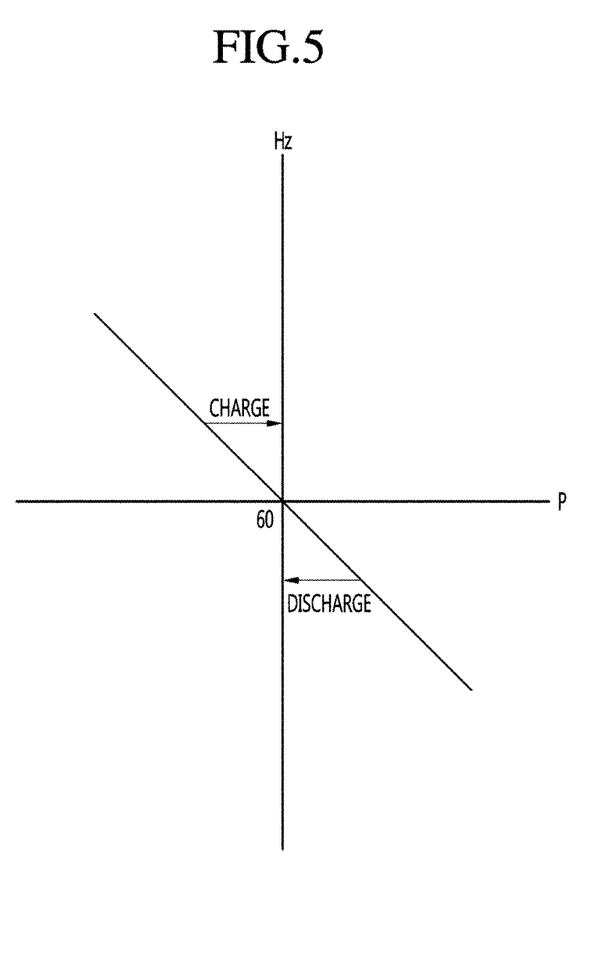
FIG. 5 is a graph illustrating a droop curve for controlling charging/discharging of a plurality of batteries according to an embodiment.

FIG. 5 is a graph illustrating a droop curve for controlling charging/discharging of a plurality of batteries according to an embodiment.

As illustrated in FIG. 5, according to an embodiment, a reference point for controlling charging/discharging of batteries may be set at about 60 Hz. Therefore, a plurality of batteries are required to maintain a frequency of about 60 Hz for the purpose of system stability.

In a specific embodiment, the charging control unit 111 may charge a battery when the frequency of the battery is lower than the reference frequency of 60 Hz. The charging control unit 111 may discharge a battery when the frequency of the battery is higher than the reference frequency of 60 Hz.

Here, an amount of charging/discharging performed in response to control by the charging control unit 111 may be determined according to the droop curve. Therefore, the amount of charging/discharging required for recovering the reference frequency of a battery may vary with the droop curve. Furthermore, the droop curve may vary with the SOC level or a frequency value of a battery.

In one embodiment, the droop curve for each battery may be set by the charging control unit 111. In another embodiment, the droop curve for each battery may be set by a system control unit for controlling the charging control unit 111. Each embodiment will be described in detail with reference to flowcharts.

Figure 6:
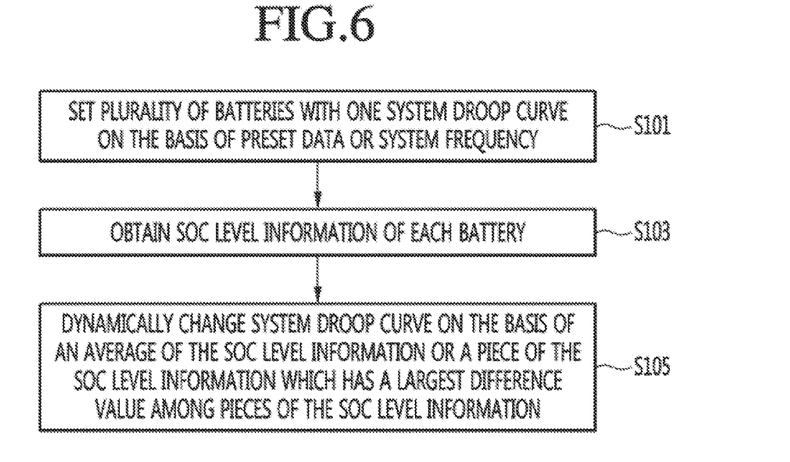
FIG. 6 is a flowchart illustrating a method for controlling charging/discharging of a battery according to an embodiment.

FIG. 6 is a flowchart illustrating a method for controlling charging/discharging of a battery according to an embodiment.

The embodiment of FIG. 6 relates to a method in which the system control unit 115 sets one droop curve for a plurality of batteries to control charging/discharging of the batteries.

The system control unit 115 sets the plurality of batteries included in one power supply system 100 with one system droop curve (S101). In detail, one droop curve applied generally to the plurality of batteries is set. The setting of the droop curve for the batteries may be performed by the system control unit 115 by controlling the charging control unit 111 for controlling each battery. Therefore, each charging control unit 111 controls the charging/discharging of each battery according to the set droop curve. Since the charging/discharging of the batteries is controlled according to one system droop curve, the frequency or the SOC level of each battery may be maintained equally.

Here, in one embodiment, the system control unit 115 may set the system droop curve on the basis of preset data. Here, the preset data may be data set when a system is initially designed on the basis of a system frequency mainly used in a corresponding country or region.

In another embodiment, the system control unit 115 may set the system droop curve on the basis of a current system frequency. Here, the system frequency may represent a frequency of electric energy received from the power plant 3. In the case where the system droop curve is set on the basis of the system frequency, the stability of the entire power supply system 100 may be improved. In detail, since a frequency of supplied electric energy matches that of a battery for storing the electric energy, the stability of charging/discharging may be improved.

The system control unit 115 obtains SOC level information of each battery while the charging/discharging is performed according to the set droop curve (S103). In detail, the system control unit 115 may obtain the SOC level information of each battery through the charging control unit 115 included in the power supply system 100. In a specific embodiment, the SOC level information may be presented as hertz (Hz) information.

In the case where the charging/discharging is controlled using one droop curve, the SOC levels of the plurality of batteries may be equally managed. However, in the case where the SOC level of a specific battery is initially different from the SOC levels of the other batteries, it may be difficult to efficiently perform the charging/discharging using the droop curve set on the basis of the system frequency or the preset data.

Therefore, it is required to evaluate the efficiency of a currently set droop curve so that each battery is charged/discharged efficiently, and the system control unit 115 collects current SOC level information of each battery as an evaluation basis. A period at which the system control unit 115 obtains the SOC level information of each battery may be determined according to a preset value. Furthermore, the period may be determined to be short when the amount of use of electric energy is large, or the period may be determined to be long when the amount of use of electric energy is small. Moreover, the period may be determined on the basis of most recent SOC level information. For example, in the case where the most recent SOC level information is a lot different from the reference frequency, the SOC level information may be obtained at a short period in order to stabilize the power supply system within a short time. Therefore, the droop curve may be changed continuously so that the SOC levels of the batteries may be stabilized quickly.

The system control unit 115 dynamically changes the system droop curve on the basis of the obtained SOC level information (S105). In detail, in the case where the obtained SOC level of each battery is different from a reference level, the system control unit 115 may newly set a droop curve for efficiently performing the charging/discharging of the batteries.

In a specific embodiment, the system control unit 115 may set a new droop curve on the basis of an average of the SOC levels collected from the batteries. In another embodiment, the system control unit 115 may set a new droop curve on the basis of an SOC level having a largest difference with a reference value among the SOC levels collected from the batteries. Here, the reference value may represent a value at which the efficiency of battery charging/discharging is maximized in a general case when a system is initially designed. Furthermore, the reference value may represent a value based on the system frequency. The system control unit 115 transfers, to the charging control unit 111 for controlling each battery, the droop curve newly set on the basis of the obtained SOC levels so as to change the system droop curve.

Figure 7:
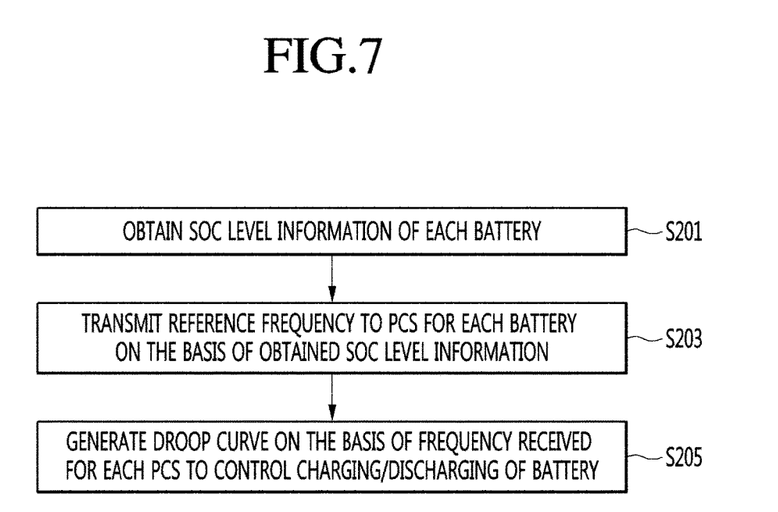
FIG. 7 is a flowchart illustrating a method for controlling charging/discharging of a battery according to another embodiment.

FIG. 7 is a flowchart illustrating a method for controlling charging/discharging of a battery according to another embodiment.

The system control unit 115 obtains the SOC level information of each battery (S201). In detail, the system control unit 115 obtains the SOC level information of each battery through the charging control unit 115.

The system control unit 115 transfers, to each charging control unit 111, a reference frequency on the basis of the SOC level information collected from each battery (S203). In detail, the system control unit 115 may obtain the SOC level information for each battery, and may determine reference frequencies optimized at different SOC levels. Furthermore, the system control unit 115 may transmit the determined reference frequencies to the charging control unit 111 for controlling each battery. The determination of the reference frequencies may be performed in the same manner as the process of determining a new droop curve described above with reference to FIG. 6.

The charging control unit 111 generates the droop curve on the basis of the reference frequency received from the system control unit 115, to control a battery (S205). In detail, the charging control unit 111 may receive the reference frequency based on the SOC level of each battery, and may generate the droop curve according to the received reference frequency. Furthermore, the charging control unit 111 controls the charging/discharging of the battery on the basis of the generated droop curve.

In general, according to the embodiment of FIG. 6, the amount of data that the system control unit 115 should calculate is small, but the amount of data required for communication for transmitting the droop curve to each charging control unit 111 may increase. On the contrary, according to the embodiment of FIG. 7, the amount of data that the system control unit 115 should calculate may increase, but the amount of data required for communication may be reduced since the reference frequency alone is transmitted to each charging control unit 111.

Therefore, the embodiment of FIG. 6 may be advantageous for a power supply system including a plurality of batteries and a charging control unit. In detail, the efficiency of control may be improved by controlling the plurality of batteries using one system droop curve alone. In addition, the embodiment of FIG. 7 may be advantageous for a power supply system including a small number of batteries and a charging control unit. In detail, the charging/discharging may be accurately controlled by generating the droop curve customized for each battery.

According to an embodiment, the power supply system may improve the efficiency of charging/discharging of batteries by setting one system droop curve for the batteries.

Furthermore, according to an embodiment, the power supply system may improve the efficiency of charging/discharging of batteries by setting the droop curve for each battery on the basis of the SOC level of each battery.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power supply system comprising a battery energy storage system comprising:
    a system control unit configured to set a first system droop curve for a plurality of batteries correlated with a load; and
    a charging control unit configured to control charging/discharging of the plurality of batteries correlated with the load on the basis of the first system droop curve,
    wherein the charging control unit obtains state of charge (SOC) level information from the plurality of batteries correlated with the load,
    the system control unit sets a unique second system droop curve on the basis of an average of the SOC level information obtained from the plurality of batteries correlated with the load, and
    the second system droop curve is applied to all batteries correlated with the load.

2. The power supply system according to claim 1, wherein the system control unit sets the first system droop curve on the basis of at least one of preset data or a system frequency.

3. The power supply system according to claim 2,
    wherein the system control unit sets the second system droop curve on the basis of a piece of the SOC level information which has a largest difference with a reference value among pieces of the SOC level information obtained from the plurality of batteries,
    wherein the reference value is at least one of a value set at an initial system designing time or a value based on the system frequency.

4. The power supply system according to claim 1,
    wherein the charging control unit obtains SOC level information from the plurality of batteries,
    wherein the system control unit determines a reference frequency for generating a second system droop curve on the basis of the SOC level information obtained from the charging control unit.

5. The power supply system according to claim 4, wherein the reference frequency is determined for each battery.

6. The power supply system according to claim 4,
    wherein the system control unit transmits the determined reference frequency to the charging control unit,
    wherein the charging control unit generates the second system droop curve on the basis of the received reference frequency, and controls the batteries on the basis of the second system droop curve.

\* \* \* \* \*